Figure 1:
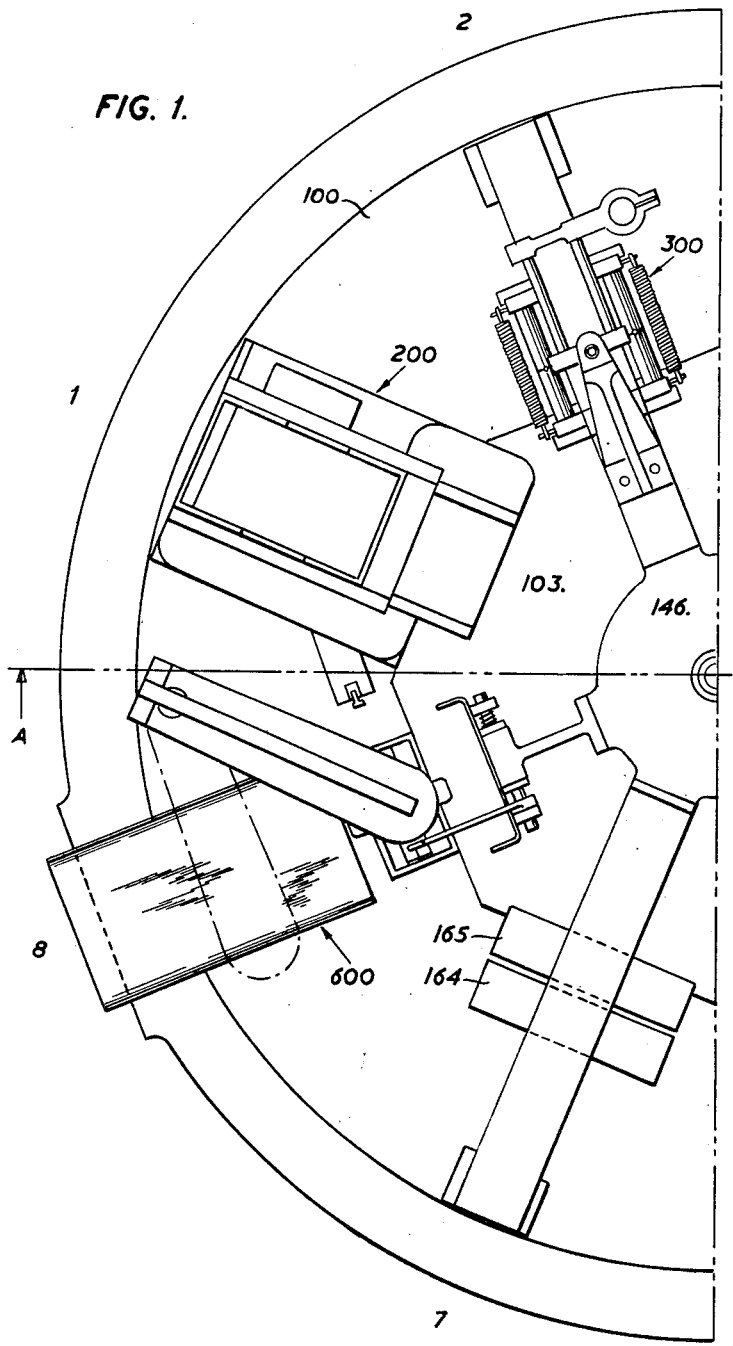

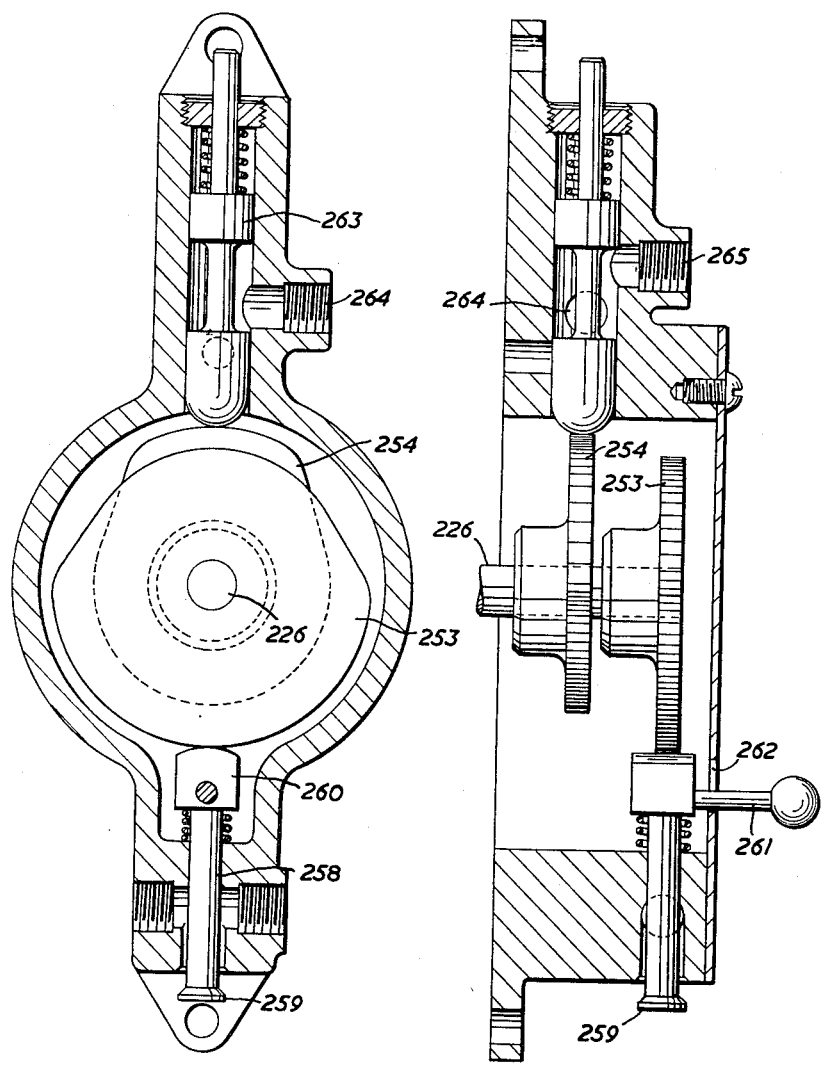

Dec. 21, 1954  R. W. BARRACLOUGH  2,697,542
BAG FILLING MACHINE
Filed Dec. 20, 1950  15 Sheets-Sheet 9

Inventor
Ronald William Barraclough
By
Attorney

Dec. 21, 1954   R. W. BARRACLOUGH   2,697,542
BAG FILLING MACHINE
Filed Dec. 20, 1950                    15 Sheets-Sheet 14
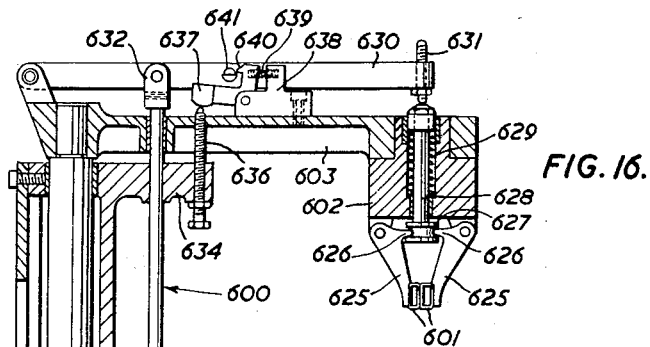
FIG. 16.
FIG. 17.
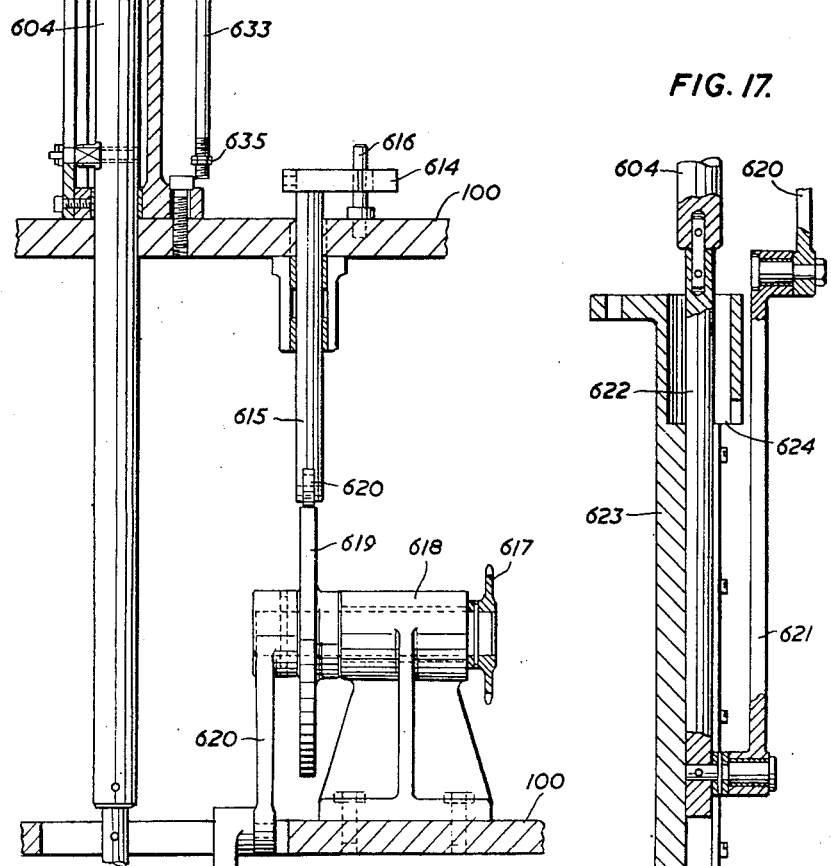
Inventor
Ronald William Barraclough
By
Attorney

United States Patent Office 2,697,542
Patented Dec. 21, 1954

2,697,542

BAG FILLING MACHINE

Ronald William Barraclough, Southport, England, assignor of one-half to R. W. Barraclough Limited, Southport, England, a British company Application December 20, 1950, Serial No. 201,747

Claims priority, application Great Britain January 20, 1950

16 Claims. (Cl. 226—49)

The present invention relates to apparatus and machines for filling bags with measured quantities of a commodity and while it has particular application to a machine for effecting this process entirely automatically, certain features of the invention are applicable to semi-automatic or manually-operated machines.

The bags employed may be of waxed or plastic-coated paper but the preferred type of bag is made of plastic film material and may be of the pouch or gusset type.

Generally the operations involved in an automatic machine for filling bags consist first, in extracting a bag singly from a stack and in inserting the bag into a suitable holder; second, in opening the bag, third, in filling the bag; fourth in closing the bag and fifth, in delivering the closed and filled bag from the machine. One of the objects of the invention is to provide an improved machine for automatically effecting these operations.

According to this feature of the invention, a machine for filling bags with measured quantities of a commodity and for delivering the filled and closed bags comprises a plurality of separate working stations arranged at equal spacings along a circular path on a horizontal table, a vertical sleeve passing through a bush in the table concentric with said circular path, a member comprising a plurality of bag holders, said member being secured to said sleeve above the horizontal table so as to present the bag holders to the working stations in succession on rotation of the sleeve, driving means for said sleeve arranged below said table and adapted to rotate said sleeve intermittently to index the bag holders from station to station, a rotatable member accommodated within said sleeve and extending beyond both ends thereof, driving means engaging the lower end of said rotatable member and coupled with said sleeve driving means and control means at the upper end of said rotatable member adapted to control the operation at said separate working stations.

The gear ratios of the driving means are so chosen that the rotatable member carrying the control means performs a complete revolution for each indexing movement of the sleeve.

In the particular embodiment of the machine to be described, a prime mover drives a horizontal countershaft arranged below the table, said countershaft being arranged radially in relation to the circular path on which the working stations lie and providing the drive to the sleeve and to the rotatable member.

A further object of the invention is to provide improved apparatus for feeding bags singly from a stack contained in a hopper and according to this feature of the invention, the stack of bags is supported by the base of the hopper at the upper part of the bag and immediately adjacent the base of the bag, a section of the bag extending across the entire width of the bag at a short distance from the base of the bag being unsupported and means are provided for engaging the lowermost bag by suction nozzles at the unsupported section and for withdrawing said suction nozzles to cause the removal of said lowermost bag from the stack.

Arrangements are also provided for holding the bag immediately above the bottom bag positively in position while the bottom bag is being removed. This is desirable owing to the fact that as the bottom bag is being removed there is a tendency for the bag above to be partially dragged with the bottom bag so that it becomes creased or folded, thereby preventing a clean feed of the bag in its turn.

Another object of the invention is to provide an improved bag-opening arrangement and according to this feature of the invention the arrangement comprises a bag support in the form of an open-mouthed container adapted to receive the bag in the closed condition and to support it with the mouth of the bag at the open end of the container, suction nozzles adapted to engage with the top edges of the sides of the bag and to withdraw said top edges to the sides of the container and latches on said container adapted to be operated to clamp said top edges against the sides of said container.

Preferably a puff of air is delivered into the bag after the clamping latches have been operated in order to open the bag to the base thereof. Conveniently the puff of air is obtained from the exhaust of the pump which provides suction to the nozzles and a cam-controlled valve serves to connect the exhaust for a short period to a pipe located above the open mouth of the container.

A further object of the invention is to provide improved means for closing the bag after it has been filled and according to this feature of the invention the bag is supported in an open-mouthed container and movable arms are adapted to be introduced into the bag to engage the bag at those points which in the closed condition of the bag lie at the extreme ends of the top of the bag, the arms moving in such a manner as to cause such points to move so that the side portions of the top edges of the bags between such points be substantially in a straight line.

It is also necessary to seal the bag after it has been closed and according to a further feature of the invention, arms are adapted to be lowered into the bag and then moved to draw together the top edges of the bag and means are provided which then seal the top edges of the bag at at least one point, the position of the seal or seals being such as to allow for the subsequent unobstructed withdrawal of the arms.

Finally a further object of the invention is to provide an improved arrangement for removing a filled bag from a container and according to this feature of the invention, a chute is located adjacent the position taken up by the container and means are provided for gripping the bag and lifting it from the container, a second pivoted chute being moved during the lifting operation to a position where it is substantially in alignment with said first chute whereupon the bag is released and is delivered down the two chutes.

Figure 2:
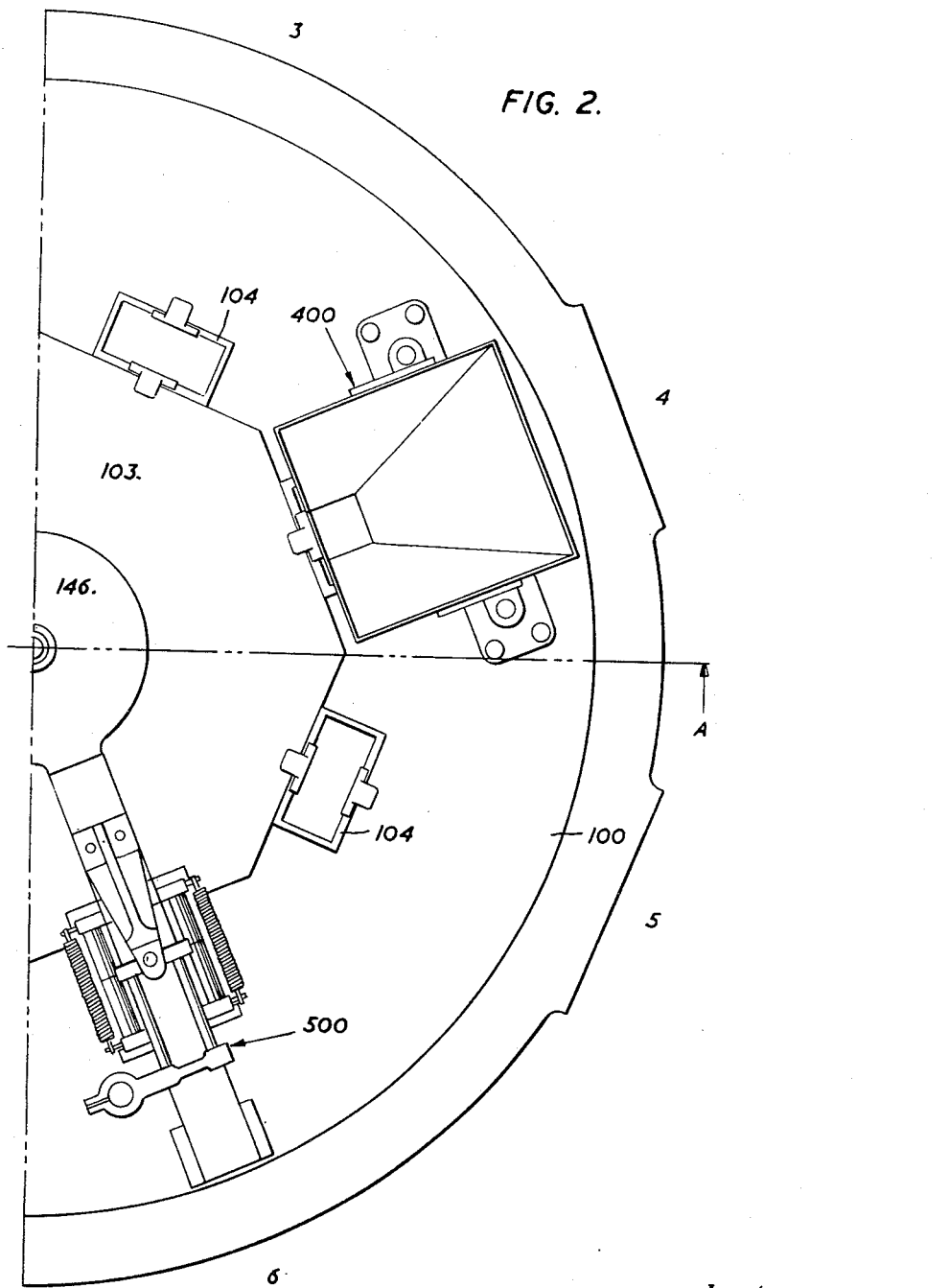
Figure 3:
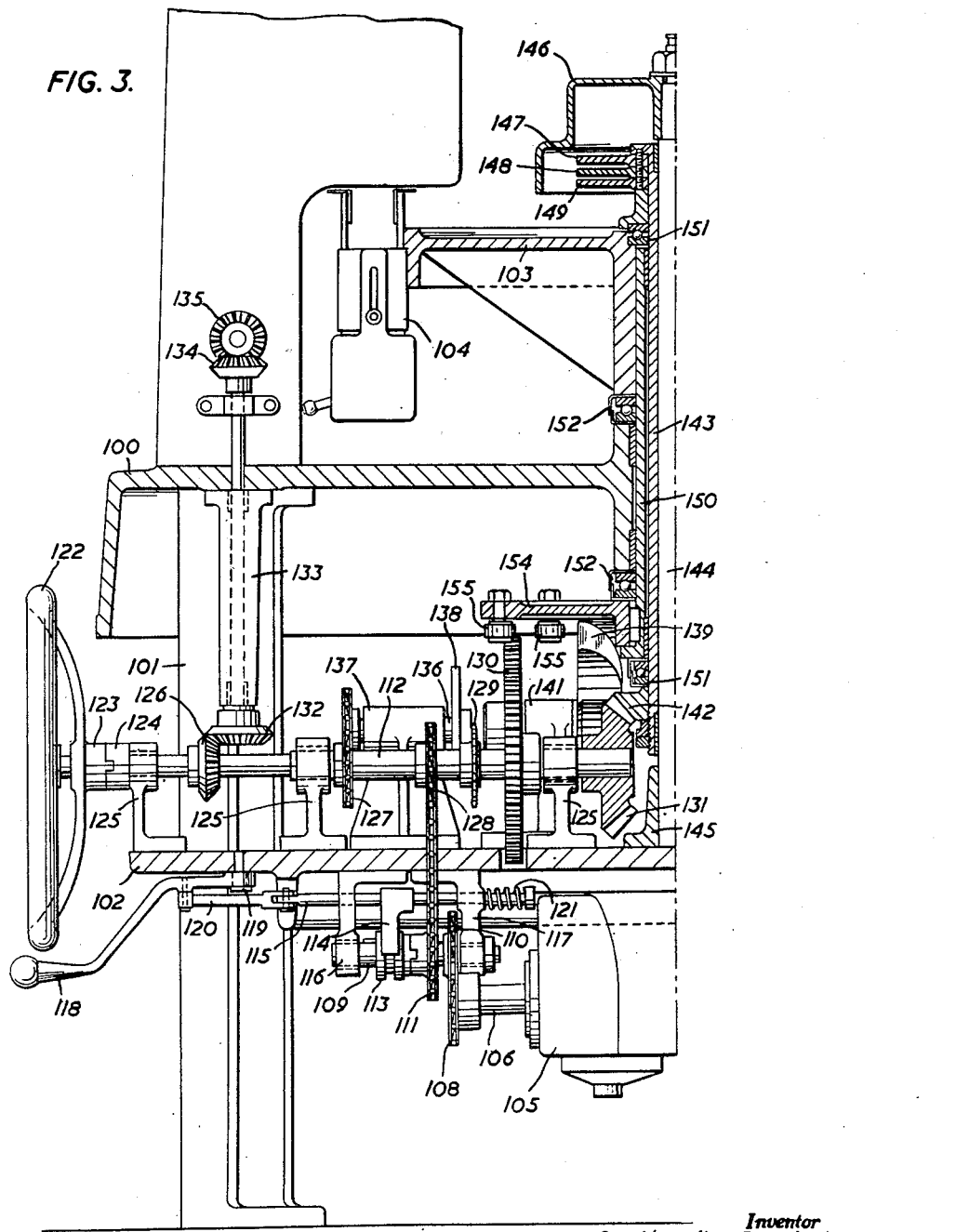
Figure 4:
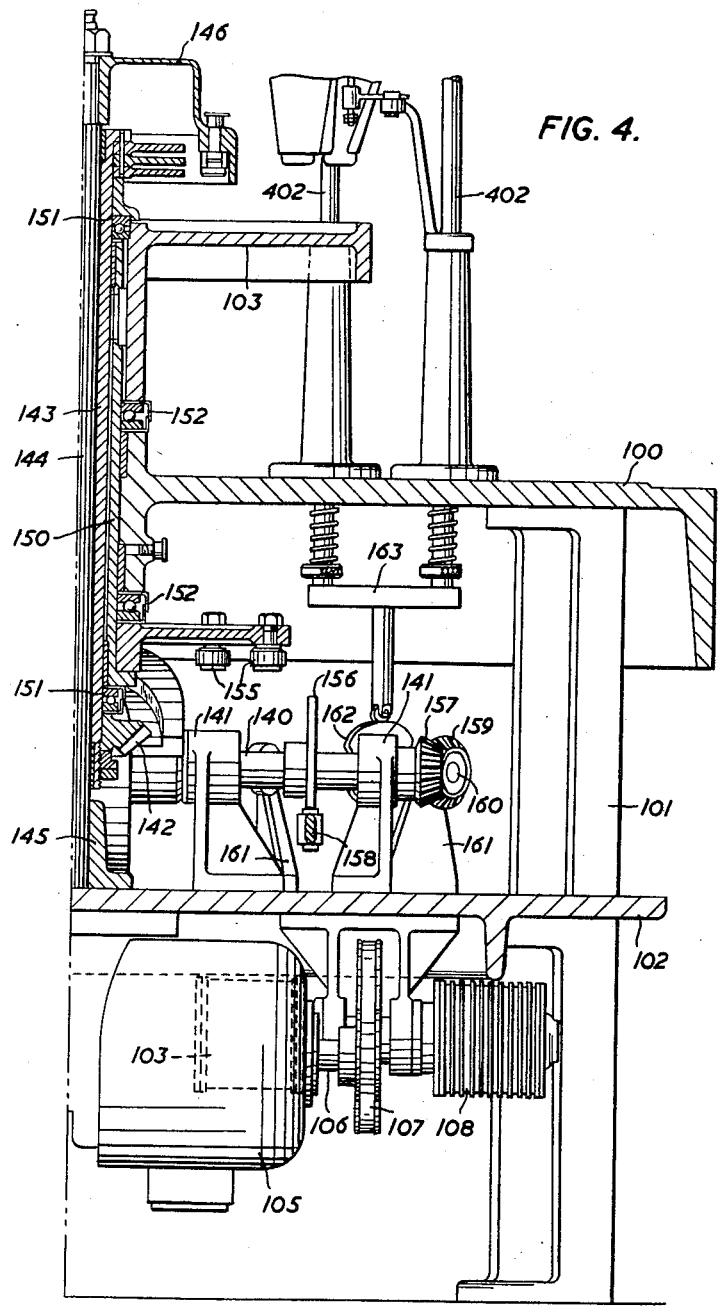
Figure 5:
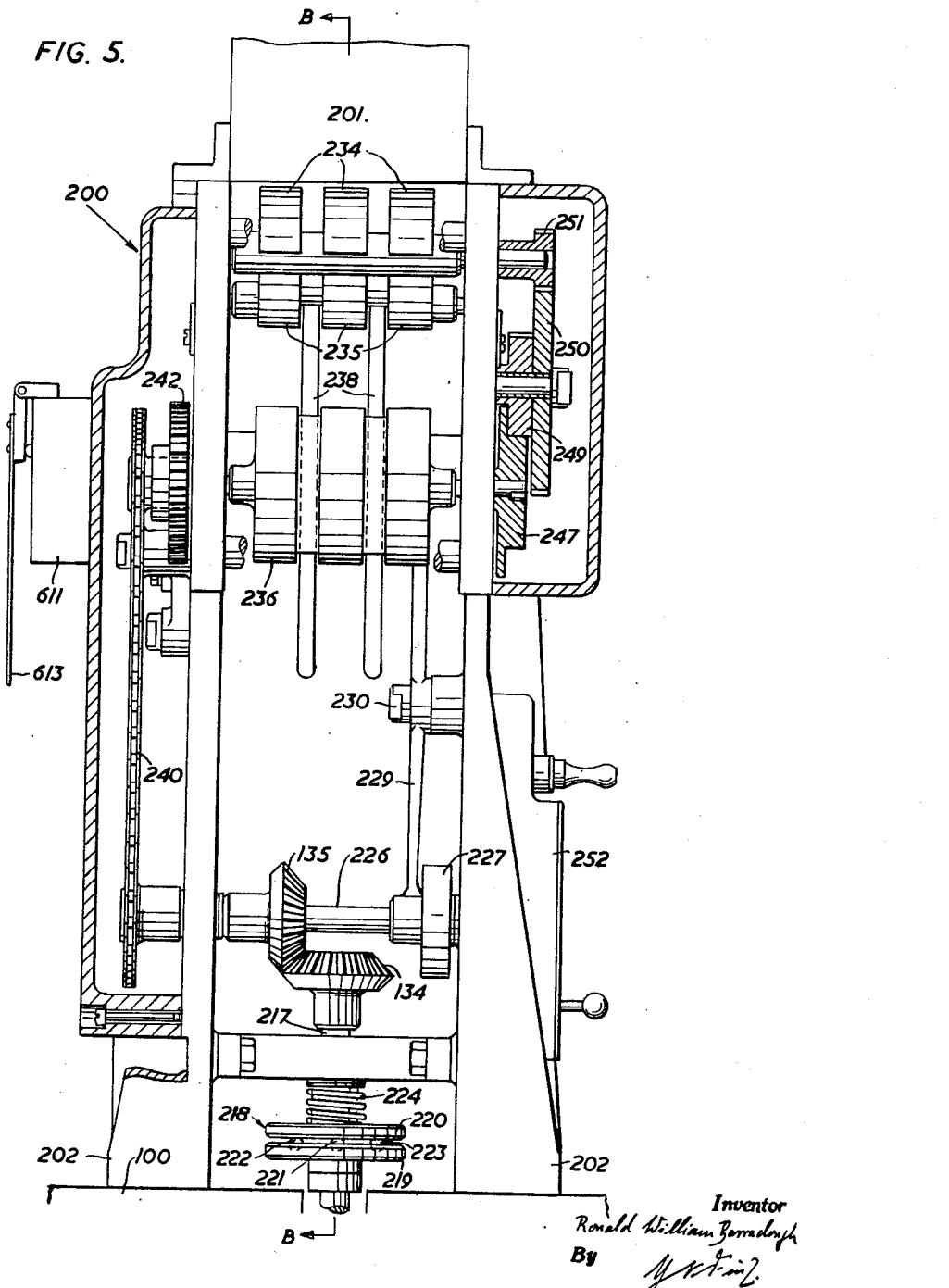
Figure 6:
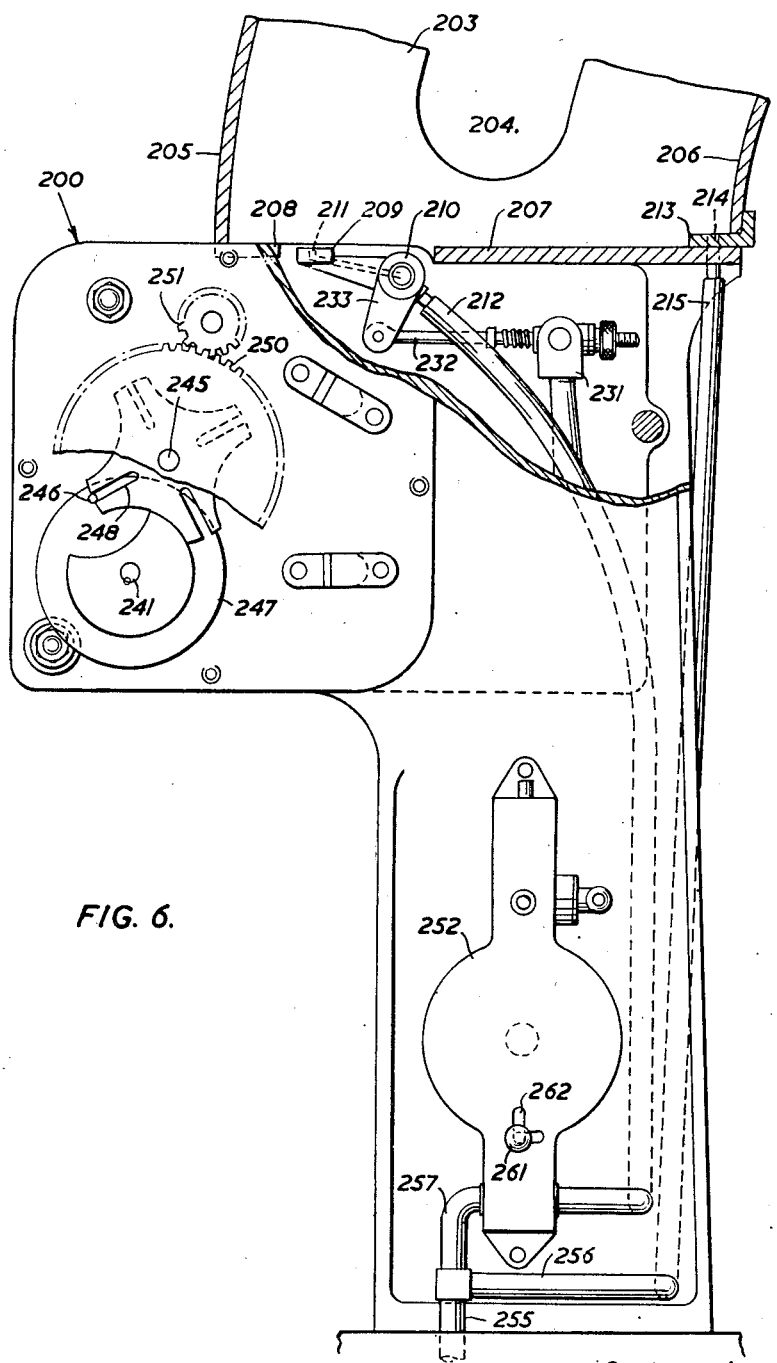
Figure 7:
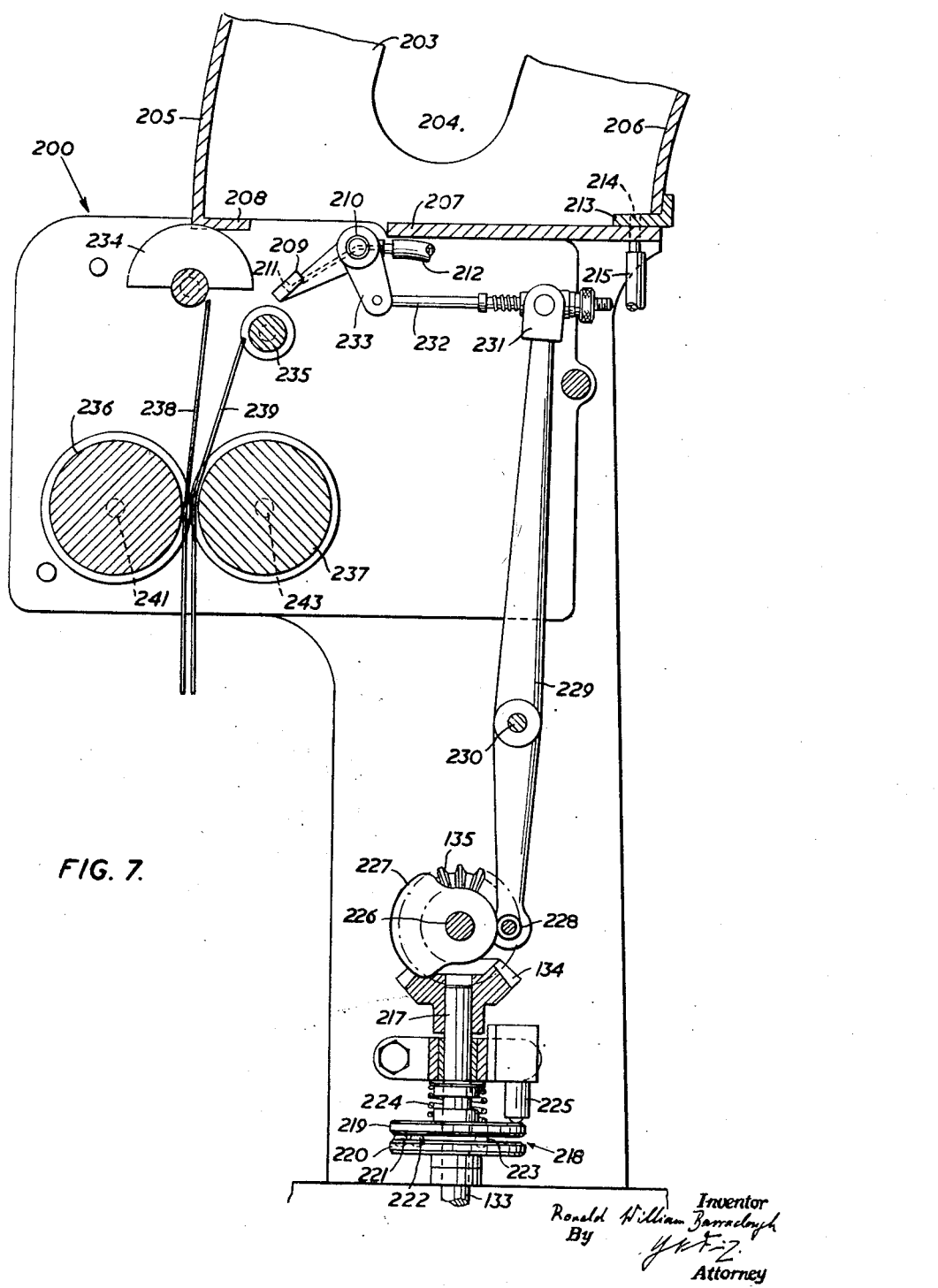
Figure 10:
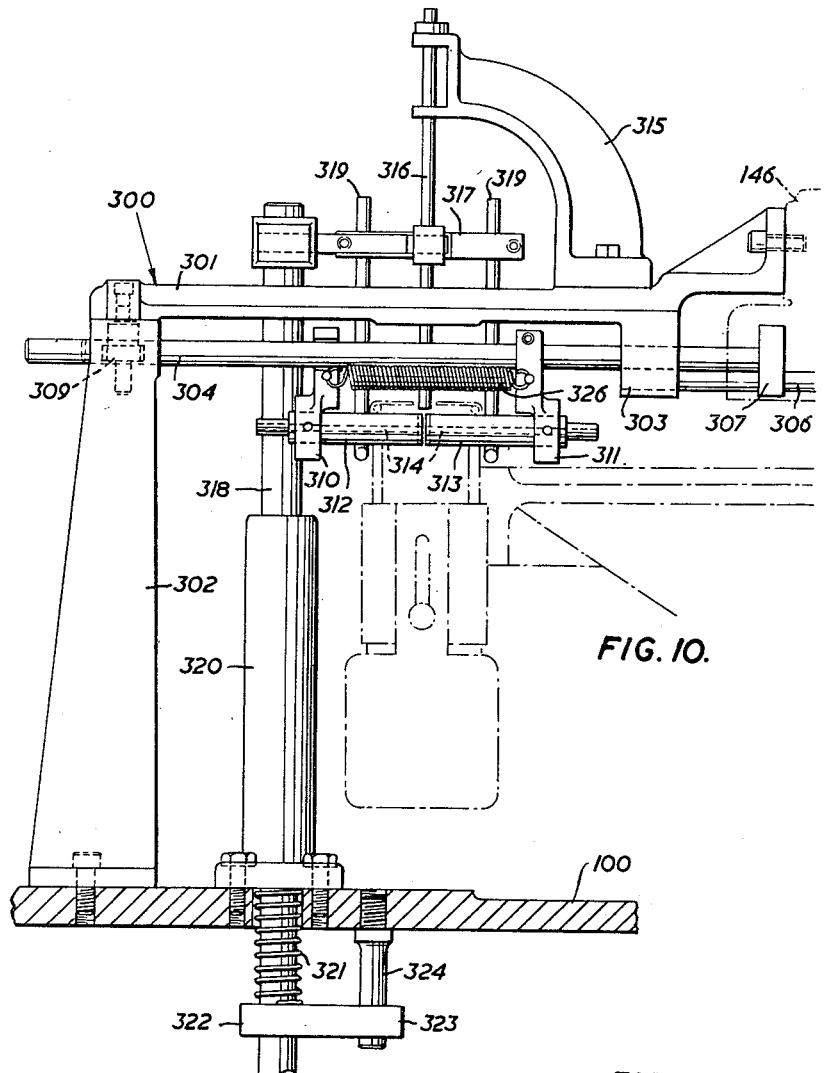
Figure 11:
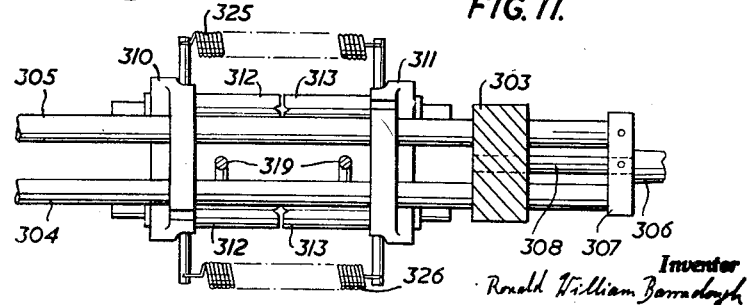
Figure 12:
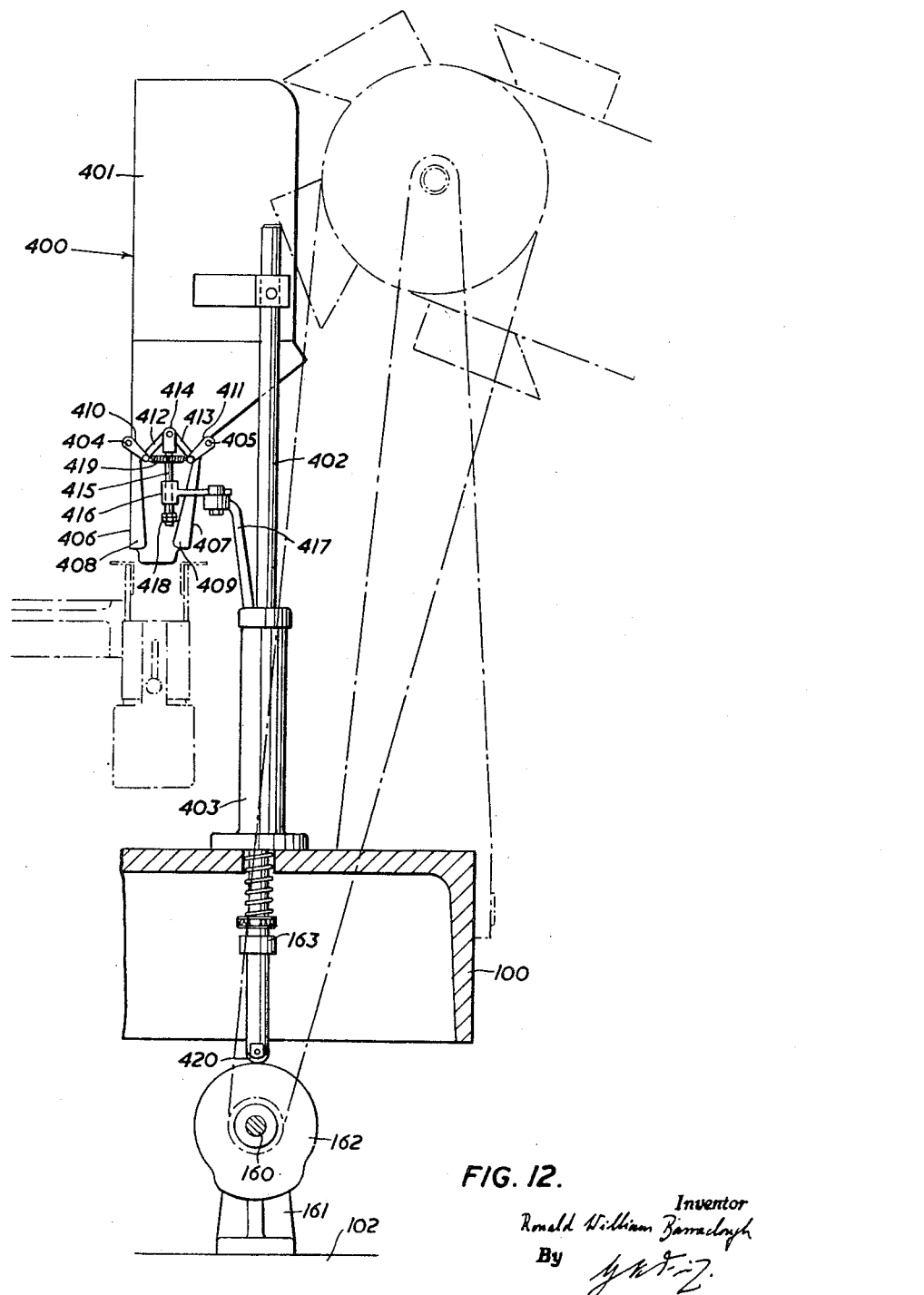
Figure 13:
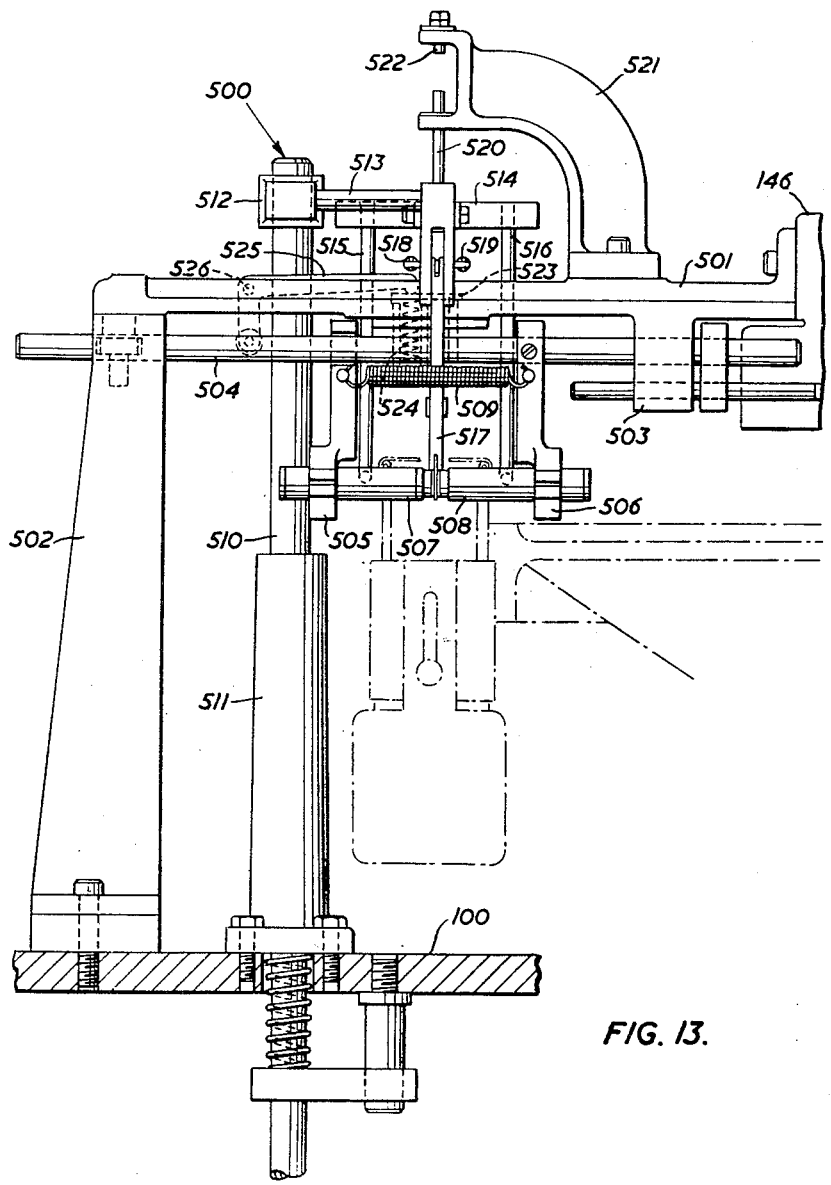
Figure 14:
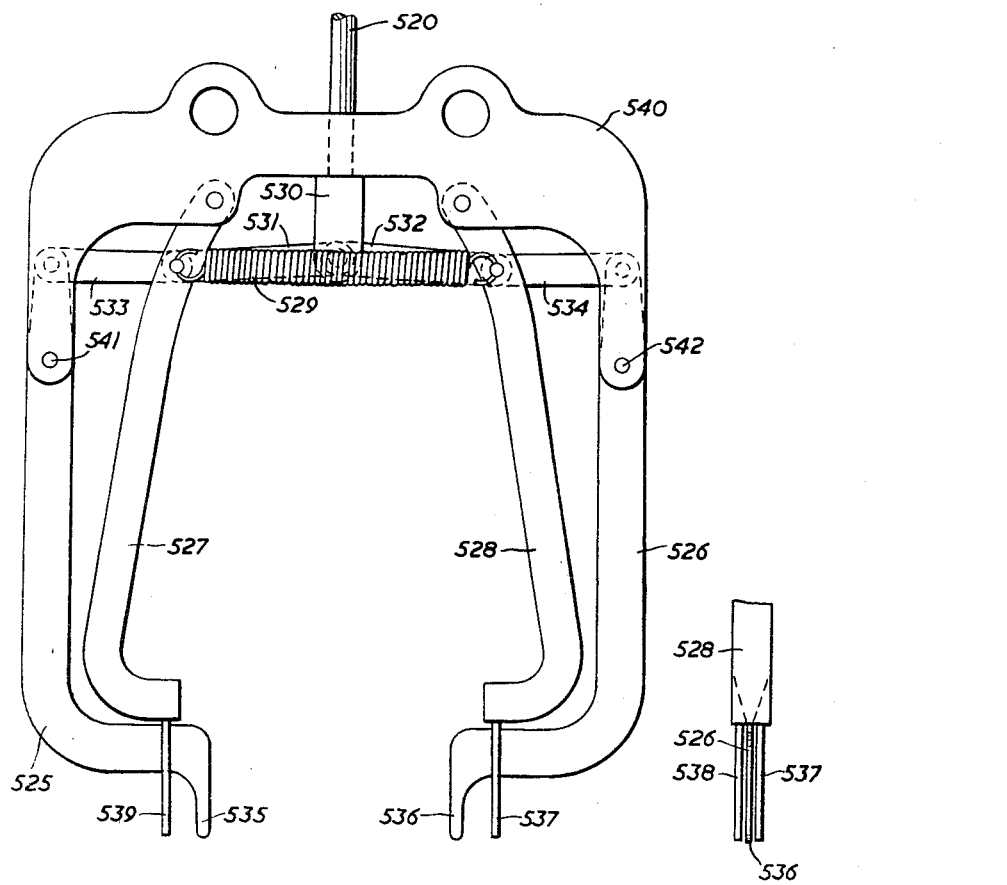
Figure 15:
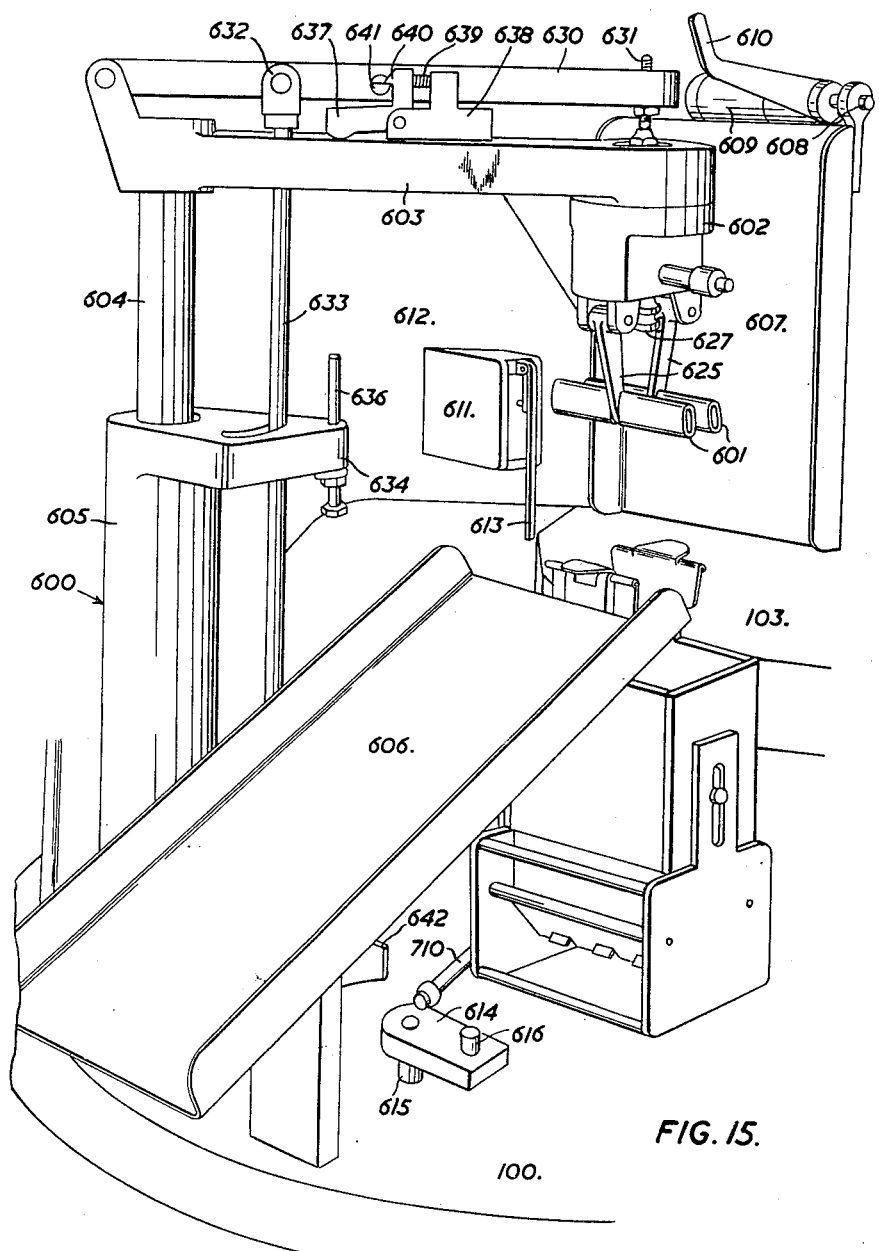
Figure 18:
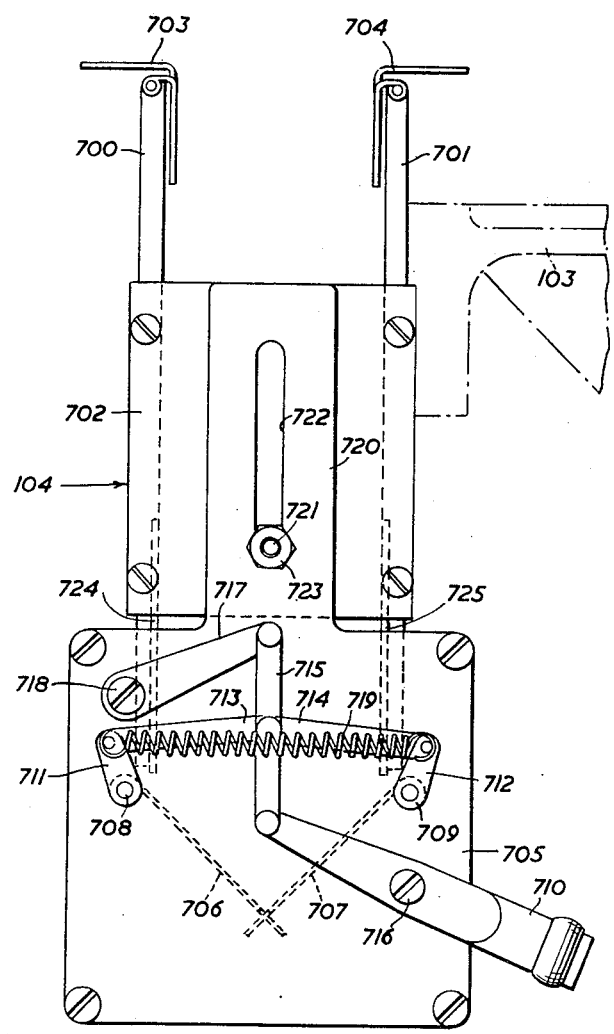

The invention will be better understood from the following description of a preferred embodiment of a fully automatic machine taken in conjunction with the accompanying drawings comprising Figs. 1 to 18, in which:

Figs. 1 and 2 when arranged side by side with Fig. 1 on the left show a plan view of the machine according to the invention, Figs. 3 and 4 when placed side by side with Fig. 3 on the left show a part sectional view along the line A—A of Figs. 1 and 2, Fig. 5 shows a front elevation of the bag feeding mechanism, Fig. 6 shows an elevation of the right-hand side of Fig. 5, Fig. 7 shows a part sectional view of the bag feeding mechanism along the line B—B of Fig. 5, Figs. 8 and 9 show front and side elevations of the cam-controlled valve mechanism forming part of the bag feeding mechanism, Fig. 10 shows a side elevation of the bag opening apparatus, Fig. 11 is a partial plan view of the apparatus shown in Fig. 10, Fig. 12 is a side elevation of the feeding hopper, Fig. 13 is a side elevation of the bag closing and primary sealing apparatus, Fig. 14 is a modification of a detail in the bag closing apparatus for dealing with gusset type bags, Fig. 15 is a general view of the ejecting apparatus, Figs. 16 and 17 are part sectional side elevations of the apparatus in Fig. 15, while Fig. 18 shows a side elevation of the bag holder.

Referring first to Figs. 1, 2, 3 and 4 the machine comprises a table 100 supported by pillars 101. Mounted on the table are individual mechanisms for effecting the various operations necessary for filling and sealing a bag. A platform 102 also supported by the pillars 101 is mounted underneath the table 100 and on the platform is mounted the prime mover for the machine which operates the drives to the different individual mechanisms. A carrier 103 is concentrically mounted with and above the table 100 and this carrier is arranged to be intermittently rotated. As will be seen from Figs. 1 and 2 the carrier is octagonal in shape and secured centrally of each flat is a bag holder 104. One holder only is shown in Figs. 3 and 4 while in Figs. 1 and 2 two holders are shown, the remainder being obscured by the equipment mounted on the table. It will be understood that the carrier 103 makes one complete revolution in eight steps and at each position a particular stage in the operation of feeding, filling and sealing a bag may be effected. These eight positions have been indicated in Figs. 1 and 2 by the numerals 1 to 8 inclusive and it will be noted that individual apparatus is provided only at positions 1, 2, 4, 6, 7 and 8, positions 3 and 5 being left vacant in order to cater for any additional operations which may be desired. With the arrangement shown in Figs. 1 and 2 the following operations take place at the various positions:

Position 1: bag feed to a bag holder
Position 2: bag opening
Position 4: bag filling
Position 5: bag closing and primary seal
Position 7: secondary seal
Position 8: bag ejection.

The individual apparatus for effecting these stages is shown in detail in subsequent drawings with the exception of the secondary sealing apparatus which follows known principles and hence is not described in detail. The individual apparatus at positions 1, 2, 4, 6, 7 and 8 have been given the references 200, 300, 400, 500 and 600 respectively in Figs. 1 and 2 and these references are used for the apparatus in general in the detailed drawings.

A detailed description will now be given of the driving mechanism as shown in Figs. 3 and 4. The prime mover for the machine consists of an electric motor 105 provided with a driving shaft 106, one end of which operates by means of the belt drive 107 two vacuum pumps 108. The other end of the driving shaft 106 is coupled by a chain drive to an intermediate shaft 109. The sprocket wheel 110 is fixed to the shaft 109, while the sprocket wheel 111 by which the main shaft 112 is driven is loose on the shaft 109. A dog clutch is formed by the hub of the sprocket wheel 111 and a co-operating member 113 which is keyed to the shaft 109 so that it rotates therewith but is capable of axial movement thereon. The member 113 is controlled by an actuating fork 114 secured to spindle 115 having bearings in the arms 116 and 117 in which the shaft 109 is also mounted. Axial movement of the spindle 115 is effected by a hand lever 118 pivoted at 119 to the under side of the platform 102. A link 120 secured to the arm 118 and the spindle 115 causes axial movement of the spindle 115 towards the left against the action of the spring 121 when the hand lever 118 is moved about pivot 119. The axial movement of the spindle 115 enables the sprocket 111 to run freely on the shaft 109 in order to facilitate manual operation of the machine by rotation of the hand wheel 122. This hand wheel is arranged to be clutched to the main shaft 112 by means of a dog clutch consisting of two parts 123 and 124. While these two parts are shown in engagement, this is purely for the ease of illustration and it will be appreciated that normally the clutch is disengaged. The main shaft 112 is supported in bearings 125 secured to the platform 102 and has mounted thereon a bevel wheel 126, three sprocket wheels 127, 128 and 129, a spur wheel 130 and a second bevel wheel 131. The bevel wheel 126 drives through the co-operating bevel wheel 132 a vertical shaft 133 which by means of the bevel wheels 134, 135 drives a horizontal spindle for controlling the bag feed mechanism which will be described in detail later.

The sprocket wheel 127 chain drives a shaft 136 mounted in a bearing 137 secured to the platform 102. The shaft 136 carries a cam disc 138 which co-operates with a cam follower and controls the operation of the bag opening apparatus as will be described in detail later.

The sprocket wheel 129 acts as a drive for the bag ejector and also for a movable abutment which, as will be described later, causes the bottom of the bag holder to open after ejection of the bag in position 8 and prior to the reception of a new bag in position 1. This operation is for the purpose of ensuring that if any of the material or articles with which the bag is filled accidentally fall into the holder instead of into the bag, they are removed before a further bag is fed in.

The spur wheel 130 serves to drive a cylindrical cam track 139 mounted on a shaft 140 mounted in bearings 141. The purpose of this cam track 139 will be described later.

Finally the bevel wheel 131 engages with a bevel wheel 142 secured to a vertical sleeve 143 surrounding a vertical shaft 144. One end of this shaft 144 rests in a bearing 145 mounted on the platform 102 while the other end carries a circular mounting arrangement 146 to which various elements associated with the individual apparatus are attached as shown more clearly in Figs. 1 and 2. Secured to the sleeve 143 are three cam discs 147, 148, 149. As these cam tracks rotate they control the operation of various elements on the individual apparatus as will be described subsequently. A second sleeve 150 surrounds the sleeve 143 and the ball bearings 151 enable the two sleeves to rotate relative to each other. The carrier 103 is secured to the sleeve 150 and the table 100 acts as a further bearing for the two sleeves, ball bearings 152 being provided between the table 100 and the carrier 103 and between the table and a plate 154 which is secured to the sleeve 150. Rotatable rollers 155 are provided on the under side of the plate 154 and co-operate with the cam track 139 in such a manner that as the track is rotated on the shaft 140 it picks up one of the rollers and rotates the plate 154 and hence the sleeve 150 and the carrier 103 through an angle of 45°, thus moving the bag holders from one position to the next successive position.

Also mounted on the shaft 140 is a cam disc 156 and a bevel wheel 157. The cam disc 156 controls the operation of a lever 158 which extends outwardly from the plan of Fig. 4. This lever is pivoted at its centre on a bearing secured to the platform 102 and the other end is pivotally secured to a vertically extending rod the up and down movement of which controls the operation of the primary seal apparatus in a manner to be described subsequently. The bevel gear 157 engages with a further bevel gear 159 mounted on a shaft 160 mounted in bearings 161. A cam disc 162 is mounted on the shaft 160 and effects the vertical movement of the bridge member 163 for the purpose of controlling the operation of the feeding hopper as will be described later.

Before proceeding with a detailed description of the individual apparatus mounted on the table 100, a description will be given of the bag holder shown in Fig. 18. The holder is formed of two parts which are relatively adjustable to accommodate bags of different sizes. The upper portion comprises a rectangular container consisting of two walls 700, 701 connected by two shorter side members of which only one 702 is shown in the drawing. Latches 703, 704 are arranged at the top edge of the walls 700, 701 the latches being spring-urged to the position shown while actuating rods associated with individual apparatus on the table engage with the horizontal portion of the latches to rotate the latches and in particular rotate the normally vertical portions away from the inner surfaces of the walls. The purpose of the latches is to hold the top edges of an opened bag against the inner surfaces and this operation will be described in detail later. The second part of the holder consists of two plates of which one 705 is shown in the drawing and a V-shaped base formed of two pivoting members 706, 707 the lower edges of which are slotted to interlock as shown in the drawing. The members 706, 707 are mounted on spindles 708, 709 and the movement of the spindles is effected by a toggle mechanism controlled by a toggle lever 710. The toggle mechanism consists of two arms 711, 712 pivoted on the spindles 708, 709 respectively, the two ends of the arms being pivotally secured to links 713, 714 both of which are pivoted to the centre point of an actuating member 715. One end of the actuating member is pivoted to the toggle lever 710 which is pivoted at 716 and the other to an arm 717 pivoted at 718. The two links 713, 714 are connected by the spring 719. The toggle mechanism is normally in the position shown in the drawing, the bottom of the holder being closed. When the filled bag has been ejected from the machine however an abutment engages with the toggle lever 710 and causes this lever to move anticlockwise. This causes the actuating member 715 to move downwards past the dead centre position whereupon the spring 719 draws together the links 713, 714 and the bottom of the holder is opened and remains open until the toggle lever in reset by a stationary cam track.

The two parts of the holder are held together by extensions such as 720 of the plates 705. Studs such as 721 on the side members engage in slots such as 722 on the extensions, the relative position of the two parts being secured by nuts such as 723. Two guide plates 724, 725 are also secured to the plates such as 705 and work in recesses in the side walls 700 and 701. It will thus be understood that by loosening the nuts, the length of the holder can be varied to suit the size of the bag employed.

A description will now be given of the bag feeding device designated 200 in Fig. 1 and for this purpose reference should be made to Figs. 5, 6, 7, 8 and 9. Referring first to Fig. 5 the bag feeding device comprises a hopper 201 in which the bags are stacked, the hopper being mounted on supports 202 secured to the table 100. The hopper consists of two vertical sides 203 (Figs. 6 and 7) each side provided with a slot 204 which facilitate the insertion of the bags. The front and rear surfaces 205 and 206 of the hopper are curved as shown in Figs. 6 and 7 and the bags are inserted in the hopper so that the closed ends, which are usually thicker than the open ends, are adjacent the wall 205 while the open ends are adjacent the wall 206. The base of the hopper by which the bags are supported consists of two portions 207, 208 separated by a gap. Within this gap is located a pivotal arm 209 which extends the width of the hopper and is mounted on a spindle 210. Suction nozzles 211 are provided in the arm 209 and as shown these connect with a suction line 212. In addition, the edges of the bags at the open end rest on a step 213 also provided with suction nozzles 214 connected to the suction line 215. The drive for the bag feeding apparatus is obtained from the vertical shaft 133 shown in Figs. 3 and 5 which drives a shaft 217 through a ball clutch 218. The ball clutch consists of two discs 219, 220 each of which has three circular tracks of different radii, each track having a depression at a certain point. The radius of the track and the angular spacing between the depression is the same in the two discs. Three balls 221, 222 and 223 are located between the discs and normally rest in the depressions. The spring 224 exerts a pressure on the top disc and normally this pressure is sufficient to enable a solid drive between the shaft 133 and 217 to be obtained. If, however, the resistance in the drive from the shaft 217 increases due for instance to faulty feeding of a bag, the disc 220 will override the disc 219 which is capable of axial movement on the shaft 217 and the balls will ride out of the depressions on the disc 219 causing axial movement of the latter in an upward direction against the spring 224 and will cause the operation of the micro-switch 225 which controls the disconnection of current to the electric motor and thus stops the machine.

The shaft 217 carries the bevel wheel 134 which is also shown in Fig. 3 and this engages with the bevel wheel 135 mounted on the shaft 226. The shaft 226 carries a cam 227 engaging with a roller 228 mounted on arm 229 pivoted at 230. A fork 231 at the other end of the arm 229 carries a spindle 232 which engages with a crank 233 integral with the pivotal arm 209.

The normal position of the arm 209 is that shown in Fig. 6 and in this position the member serves as an additional support for the stack of bags in the hopper. The member remains in this position as long as the roller 228 (Fig. 7) rides on the enlarged portion of the cam 227. When the roller moves on to the reduced portion of the cam, the arm 209 moves to the position shown in Fig. 7 and during this movement the suction applied to the nozzles 211 draws the end of the bottom bag of the stack below the portion 208 of the base of the hopper and presents the end of the bag to the two rollers 234 and 235. In addition, the downward movement of the member 209 draws the open end of the bag away from the suction nozzles 214 but these nozzles are still effective as regards the bag above the bottom bag. The nozzles 214 are provided since in their absence it is found that the downward movement of the arm 209 not only carries the bottom bag with it but also tends partially to draw the bag above the bottom bag. This partial feeding of the bag above the bottom bag is obviously undesirable from the point of view of a clean feed and it is prevented by the nozzles 214. It will be noticed that the roller 234 is in the form of a semi-cylinder while the roller 235 and also the feed rollers 236 and 237 are completely cylindrical. The roller 234 is driven intermittently in a complete revolution while the rollers 236 and 237 are driven continuously. The stationary position of rollers 234 and 235 is that shown in Fig. 7 and when the member 209 is in the lowest position shown in Fig. 7, the end of the bag rests on the roller 235 but is out of contact with the semi-cylindrical roller 234. The roller 234 now begins to rotate and the timing of the operations is such that as the roller 234 engages with the bag as it rests on roller 235, the suction is cut off from the nozzles 211 to facilitate the feeding of the bag. The control of the suction to the nozzles 211 is effected by the valve mechanism 352 in a manner described in detail later. From the rollers 234 and 235 the bag is fed to the rollers 236 and 237 through fixed guides 238 and 239 the lower ends of the guides being positioned just above the bag holder. The drive for the two pairs of feed rollers is taken from the shaft 226 as shown in Fig. 5. The chain drive 240 carries the drive to a shaft 241 (Fig. 7) which is geared in a 1–1 ratio by a gear wheel 242 with a second gear wheel (not shown) to a shaft 243, the rollers 236 and 237 being mounted on the shafts 241 and 243 respectively. Also mounted on the shaft 241 is a driving member 247 of a Geneva cross drive which intermittently rotates the shaft 245. This Geneva cross mechanism is a well known type and comprises a pin 246 secured adjacent the periphery of the driving member 247 and arranged to engage a slot such as slot 248 in the member 249 secured on the shaft 245. Also mounted on this shaft is a gear wheel 250 which engages with the gear wheel 251 for driving the feed roller 234.

It will be understood that by driving the semi-cylindrical rollers through a Geneva cross mechanism the time interval for the presentation of the bag to the rollers is increased with a corresponding increase in the speed at which the bag is fed away from the bottom of the stack by the action of the rollers.

With regard to the valve mechanism 252, this is controlled by cams as shown in Figs. 8 and 9. The cams are mounted on and rotated by the shaft 226 and the cam 253 controls the connection and disconnection of suction to the pipe 212. Suction from the pump is taken to the valve mechanism from the pipe 255 (Fig. 6), one branch 256 going direct to the nozzles 214 while the other branch 257 goes to the left-hand port of the mechanism as shown in Figs. 6 and 8. There is a direct connection between the left-hand and right-hand ports but the downward movement of the spindle 258 under the control of the cam 253 causes the valve 259 to open whereupon the pressure at the nozzles 211 becomes atmospheric. The valve rod 258 is provided with an enlarged end 260 carrying a lever 261 which extends through a slot 262 in the valve casing. As shown in Fig. 6 this slot is rectangular and the lever 261 may be manually operated into the right-hand portion of the slot so as continuously to disconnect suction from the nozzles 211 for test purposes. The cam 254 controls the movement of the valve 263 which connects port 264 with port 265. Port 264 is connected to the pump exhaust while 265 is connected to the bag opening mechanism for the purpose of delivering a puff of air into the bag to separate the sides of the bag as will be described later.

A description will now be given of the bag-opening apparatus designated 300 in Fig. 1 and shown in detail in Figs. 10 and 11. This apparatus comprises a bridge 301 secured at one end to the circular mounting arrangement 146 (Figs. 1 and 2) and at the other end to a pillar 302 fixed to the table 100. A depending portion 303 of the bridge serves as a bearing for two actuating rods 304, 305, the other bearings for the rods being formed in the pillar 302. The movement of the two rods is controlled from the cam track 149 (Fig. 3) which rotates within the mounting arrangement 146 as previously explained. The cam track 149 acts through the member 306 secured to a cross-piece 307 either directly or preferably through a cam-follower. The rod 305 is also secured to the cross-piece 307 but the rod 304 passes freely through a hole therein. A short supporting spindle 308 is also secured to the cross-piece and passes freely through a hole in the depending portion 303. The two rods are coupled together in the bearing in the pillar 302 by means of a toothed wheel 309 which engages in corresponding teeth formed in each of the rods. Bridge members 310, 311 each carrying a pair of cylindrical members 312, 313 respectively are mounted on the actuating rods, the bridge member 310 being secured to the rod 305 and being free on the rod 304 while the bridge member 311 is secured to the rod 304 and is free on the rod 305. The two bridge members are coupled by springs 325 and 326 which tend to draw them together. The cylindrical members are provided with a central bore 314 and the reduced end of each cylindrical member is connected by a pipe (not shown) to a suction line which includes a valve for connecting and disconnecting the suction in timed relation to the operation of the remainder of the apparatus.

A bracket 315 secured to the bridge 301 serves as a bearing for a pipe 316, the top end of which is connected to a pressure line extending from the valve mechanism 252 (Fig. 6) attached to the bag feeding apparatus for the purpose previously mentioned. The pipe 316 also serves as a guide for a carrier 317 secured to the vertical shaft 318 and carrying two spindles 319. The shaft 318 is vertically movable in the bearing 320 under the control of the cam 138 (Fig. 3). A spring 321 extends between an abutment 322 fixed to the shaft 318 and the top of the bearing, the abutment having an extension 323 provided with a hole through which the guide pin 324 extends.

The operation of the apparatus is as follows: In the normal position the shaft 318 is maintained in its topmost position by the cam 138, thereby tensioning the spring 321 and raising the carrier 317 to its topmost position. The member 306 is at this time following the raised portion of the cam 149 so that the actuating rod 305 is moved to the left relative to the position shown and the actuating rod 304 to the right against the tension in the springs 325 and 326. The pairs of suction nozzles 312 and 313 are consequently withdrawn from each other.

When a bag holder is rotated to the bag opening position, the shaft 318 is lowered under the control of the cam 138 and eventually the spindles 319 engage with the horizontal portions of the latches on the bag holder. Continued downward movement of the spindles causes the latches to pivot so that the vertical portions are moved away from the side of the bag holder. This continues until the vertical portions of the latches are almost horizontal. While this operation is proceeding the reduced portion of the cam 149 begins to act on the member 306 with the result that the actuating rod 305 begins to move towards the right and the rod 304 towards the left, the movement being assisted by the tension in the springs 325 and 326. The nozzles 312 and 313 are thus caused to approach the upper edges of the bag and eventually the apparatus is in the position shown in the drawing whereupon suction is applied to the nozzles 312 and 313. The member 306 then arrives at the reduced portion of the cam 149 and the nozzles begin to separate, the nozzles 312 carrying the left-hand top edge of the bag towards the left while the nozzles 313 carry the right-hand top edge of the bag towards the right thus opening the bag. When the nozzles are fully retracted, that is when the top edges of the bag are against the sides of the bag holder, the shaft 318 begins to rise under the action of the cam 138 and carries with it the spindles 319. The spring latches thus return to their normal position in which they now hold the top edges of the bag secure against the sides of the bag holder. The suction is now disconnected from the nozzles 312 and 313 and a puff of air is blown into the bag through pipe 316 thus opening fully the sides of the bag.

The bag holder is now rotated to position 4 in which it is filled, for example, with sweets. The apparatus for effecting this operation is shown in Fig. 12 and consists of a hopper 401 into which the sweets are deposited either manually or automatically by means of a conveyor. In Fig. 13 a conveyor has been indicated in dotted lines but since this forms no part of the present invention it will not be described in detail. The hopper 401 is carried by two shafts 402, one only of which is shown in Fig. 13 while the two are shown in Fig. 4. The two shafts are movable in bearings 403 and are carried by the cross-bar 163 more clearly shown in Fig. 4. One side of the hopper is straight as shown but the other three sides converge to form an open mouth which is slightly smaller than the open mouth of the bag in the holder. The lower portions 406 and 407 of the straight rear and front faces of the hopper are secured to the spindles 404 and 405 which are hinged to the upper portions of the rear and front faces, the portions 406 and 407 having flaps 408 and 409 which overlap the sides of the hopper. The purpose of providing the hinged portions is to enable the mouth of the hopper to be opened slightly after the sweets have been discharged into the bag in order to free any sweet which may have become lodged in the mouth. The mechanism for effecting this consists of a toggle device comprising arms 410 and 411 mounted on the spindles 404 and 405 and connected to two links 412 and 413 both of which are pivotally secured to the fork 414 fixed to the shaft 415. The shaft 415 passes through a bearing 416 secured to a support 417 fixed to the bearing 403. The lower end of the shaft 415 is provided with a stop 418 so that it can only partake of limited movement during the up and down movement of the hopper. Finally the ends of the arms 410 and 411 are connected by a spring 419.

The operation is as follows: When a bag holder arrives under the hopper, the cam follower 420 is just about to ride off the raised portion of cam 162. As it does so, the hopper is lowered so that the mouth of the hopper is just above the mouth of the open bag in the holder. The conveyor is operated in timed relation with the movement of the hopper so that when the hopper reaches its lowest point, the conveyor tips the contents of one container into the hopper. These fall down the hopper and into the bag. Eventually cam follower 420 rides on to the raised portion of cam 162 and the hopper is raised. As the hopper approaches its topmost position, the stop 418 abuts against the bearing 416 and is thus prevented from moving with the hopper during the remainder of the movement of the latter. As a consequence the arms 410 and 411 are rotated clockwise and anticlockwise respectively about the spindles 404 and 405 due to the action of the links 412 and 413 and hence the lower portions 406, 407 of the hopper are pivoted outwards. The amount of movement of the hopper after engagement between the stop 418 and the bearing 416 is such as to cause the links 412 and 413 to pass the dead centre position whereupon the spring 419 will draw the arms 410 and 411 together again and the portions 406 and 407 will return to the position shown. The toggle device will be reset when the cam follower 420 next rides on to the raised portion of the cam 162 due to the engagement between the bearing 416 and the lower face of the fork 414.

The bag closing and primary seal operation is effected in position 6 by the individual apparatus 500 shown in Fig. 13. This apparatus comprises a bridge 501 secured at one end to the circular mounting arrangement 146 (Figs. 1 and 2) and at the other end to a pillar 502 fixed to the table 100. A depending portion 503 of the bridge serves as a bearing for two actuating rods of which only one 504 is seen in the drawing. The other bearing for the rods is formed in the pillar 502. The movement of the two rods is controlled from the cam track 147 (Fig. 3) in exactly the same manner as described for the actuating rods 304 and 305 (Figs. 10 and 11). A bridge member 505, 506 is secured to each actuating rod in the same way as the bridge members 310 and 311 (Figs. 10 and 11), each bridge member 505 and 506 carrying a pair of electrode holders one of each pair being shown in Fig. 13 at 507 and 508. Suitable electrical connections (not shown) are connected to the holders and supply heating current, seating being effected by applying heat to the top edges of the bag. In the normal position, the electrode holders are separated, bridge member 505 taking up a position to the left of that shown and bridge member 506 to the right, the spring 509 connecting the two members being then under tension. In this position the cam follower on which the cam track 147 acts to control the actuating rods is in engagement with the rise of the cam track. As the follower moves off the rise, the bridge members are drawn together by the spring 509, the actuating rods moving in opposite directions.

A shaft 510 is carried in a cylindrical bearing 511 fixed to the table 100 and extends below the table. The lower end of the shaft is secured to the rocking lever 158

(Fig. 4) and during operation the shaft performs an upward and downward movement under the control of this lever. The upper end of the shaft carries a crosspiece 512 on which are mounted two cylindrical supports, one only 513 being shown in the drawing. These supports serve as a mounting for a crosshead 514 which carries two depending spindles 515, 516. The crosshead 514 also carries the bag-spreading arms such as 517. These arms are controlled by a toggle mechanism (not shown) and in the normal position are drawn together by two springs 518 and 519. The toggle mechanism which is similar to that shown in Fig. 14 to be described later consists of two arms secured at one end to the bag-spreading arms and at the other end to a fork secured to one end of the spindle 520. This spindle moves in a bearing on a bracket 521 fixed to the bridge 501 and adapted to engage in its upper position with an adjustable abutment 522. Seated on the bridge 501 is a plate 523 which is spring-urged in the upward direction by the spring 524. The plate 523 is controlled by a bell-crank lever 525 pivoted at 526 to the bridge 501, the lower end of the lever being in the path of movement of the bridge member 505.

The operation of the apparatus is as follows: On the rotation of a bag holder with the filled bag to position 6, the shaft 510 begins to move downwards and the bag spreaders carried by the crosshead 514 enter the open bag, the spreaders being in their retracted position. Simultaneously the spindles 515, 516 engage with the latches 703, 704 (Fig. 18) on the bag holder so that the freeing of the edges of the bag takes place at the same time as the bag spreaders move into the bag. When this operation is approaching completion, the actuating rods such as 504 are controlled jointly by the spring 509 and the cam track 147 to move in such a direction that the bridge members 505 and 506 are drawn together and the electrode holders approach the top edge of the bag. Shortly after the initiation of this movement, the bell-crank lever 525 will be released by the movement of bridge member 505 to the right. This enables the spring 524 to press the plate 523 upwards to trip the toggle mechanism whereby the bag-spreading arms are moved outwardly to their expanded position to engage the inner vertical edges of the bag and the top edges having been freed from the latches on the holder, the mouth of the bag is closed. This operation takes place at the time when the bag-spreading arms reach the lowest point in their downward movement. The sealing electrodes now engage the top edge of the bag to effect a primary seal at two spaced positions along the top edge. The engagement of the electrodes with the top edge of the bag is only momentary and the bridge members are then withdrawn under the control of the cam track 147. It should be explained that the particular form of bag sealing apparatus shown is arranged for dealing with bags made of plastic material so that it is sufficient to apply heat to the edges of the bag to effect a seal.

When the bridge members are returned to the normal position the bell crank lever 525 is rotated in an anti-clockwise direction and the plate 523 is moved downwards against the spring 524. Also as soon as the sealing electrodes are withdrawn from the top edge of the bag, the shaft 510 begins its upward movement to withdraw the bag spreaders from the bag, the spreaders being withdrawn in their expanded position. Finally when the shaft approaches its top limit of movement, the spindle 520 engages with the pin 522. The shaft continues to rise after this engagement and the relative movement between the spindle 520 and the toggle mechanism which is carried by the crosshead 514, serves to reset the toggle mechanism and the bag spreading arms are returned to their retracted position.

Briefly, therefore, the sequence of operations is firstly the lowering of the bag-spreading arms into the open bag followed by the release of the latches on the bag holder and the closing of the bag by the bag spreading arms upon the tripping of the toggle mechanism. Tack sealing then takes place followed by the withdrawal of the bag-spreading arms in their expanded position. Finally when the bag spreading arms are completely withdrawn, the toggle mechanism is reset and the apparatus is ready to deal with the next bag.

The next position, position 7, is provided for sealing the whole of the top edges of the bag. This equipment is not shown in detail but consists as indicated in Fig. 1 of two sealing electrodes 164 and 165 each mounted on a bridge member operated by actuating rods controlled from the cam track 148 (Fig. 3). The arrangement of the bridge members and actuating rods and the control thereof by the cam track 148 is the same as that described with reference to the bag-opening apparatus (Figs. 10 and 11) and the bag-closing and primary seal apparatus (Fig. 13) and will thus be readily understood without further description. The sealing electrodes extend the whole width of the top edge of the bag to effect a complete seal.

It will be appreciated that the necessity of sealing in two stages arises from the fact that the bag has to be closed and sealed before the bag-spreading arms are withdrawn. The sealing of the top edge of the bag at two spaced points enables this to be done and the primary seal is sufficient to maintain the bag closed until it passes to the secondary sealing position. It will be appreciated that the primary seal need not be effected at two points only. It may, for instance, be sealed at one point, or it may be sealed at more than the two points as long as the bag spreading arms are capable of unobstructed withdrawal from the bag.

The above description of the bag-closing and primary sealing apparatus has been concerned with bags of the pouch type. It is however possible to deal with bags of the gusset type by a modification of the bag-spreading arms. This modification is shown in Fig. 14. Referring to this drawing, the bridge 540 forms a bearing for the spindle 520 shown in Fig. 13. Two pairs of arms 525, 526 and 527, 528 are provided instead of the one pair shown in Fig. 13 and both pairs of arms are pivotally mounted on the bridge 540, while 527 and 528 are urged together by the spring 529. The spindle 520 is provided with a fork 530 to which are pivoted two arms 531 and 532, the other ends of the arms being pivotally secured to the two spreading arms 527 and 528. Also pivotally mounted on the spreading arms are links 533 and 534, the other ends of which are pivotally connected to the arms 525 and 526 which are in turn pivoted on the bridge 540 at 541 and 542. The arms 525 and 526 are each provided at their ends with downwardly extending projections 535 and 536 while each of the movable arms carry two downwardly extending pins 537, 538 for 528 which pass one on each side of the arm 526. One pin 539 only is shown for 527. In the drawing the arms are shown in their expanded position, while in the normal position the pins 537 and 539 are to the left and right respectively of the projections 536 and 535. In this embodiment it is unnecessary for the arms to extend down to the bottom of the bag to effect the closing operation, it is only necessary for the bridge 540 to be lowered sufficiently for the projections 535, 536 and the pins 537, 538, 539 in their normal positions to extend into the mouth of the bag whereupon on the tripping of the toggle mechanism, the pins 537, 538 and 539 with its fellow draw the two outer edges of the bag to the right and left respectively while the projections 535 and 536 engage with the re-entrant folds of the bag. Primary sealing now takes place as before and the arms are then raised clear of the bag and the toggle is reset as previously described.

The apparatus for removing the bag from the bag holder and for ejecting the bag from the machine is shown in Fig. 15 while a part sectional view of the operating mechanism is shown in Figs. 16 and 17. Referring first to Fig. 15, the bag holder is shown in position below a pair of jaws 601 carried by a head 602 mounted on an arm 603. The arm 603 is secured to the top end of a shaft 604 mounted in a bearing 605 and controlled by mechanism to be described later to make an up and down movement. When the bag holder arrives at the position shown, the arm 603 is descending with the jaws 601 open as shown. This downward movement continues and at the end of the stroke the jaws 601 are positioned one on each side of the top edge of the closed bag. The jaws now close to grip the top edge of the bag and the shaft 604 begins its upward movement, thereby lifting the bag out of the holder.

Two chutes for the delivery of the bag are provided, one of which 606 is stationary while the other 607 is fixed to a spindle 608 passing through a bearing 609 which is fixed to an arm (not shown) extending from the mounting arrangement 146 (Figs. 1 and 2). Also mounted on the spindle 608 is an abutment lever 610 arranged in the path of the arm 603. Normally the chute 607 hangs vertically but towards the end of the upward movement of the shaft 604, the arm 603 engages with the abutment lever 610 and the chute 607 is rotated on the spindle 608 until at the end of said upward movement the chute 607 is substantially continuous with the chute 606. The jaws 601 now open and the bag is discharged down the chutes into a suitable container (not shown).

A micro-switch 611 is secured to the wall 612 of the bag feeding apparatus (Fig. 5) and is adapted to be operated by means of the flexible metal strip 613. If when the bag holder passes from position 8 to position 1 the bag has not been removed, the bag will make contact with the strip 613, the switch will be operated and the motor stopped.

In addition an abutment member 614 is mounted on a shaft 615 which also makes a small up and down movement, the member 614 being guided by a pin 616 secured to the table 100. The abutment member 614 is arranged to move upwards when the bag is being delivered from the machine and in so doing trips the toggle on the bag holder by engagement with the toggle lever 710. The bottom of the bag holder is thus opened as previously described and any sweets which may have fallen into the holder instead of into the bag during the filling operation will fall through the holder and down a chute (not shown) in the table 100. The bottom of the container is closed as the holder moves from position 8 to position 1 by engagement of the toggle lever 710 with the stationary cam track 642.

A description will now be given of the driving and control mechanism which provides for the vertical movement of the shaft 604 and the opening and closing of the jaws 601. It was mentioned in connection with Fig. 3 that the drive for the bag remover and ejector is obtained from the sprocket wheel 129. This sprocket drives the sprocket 617 (Fig. 16) mounted on a shaft 618 which also carries a cam disc 619 and a driving crank 620. The cam disc 619 engages with a cam follower 620 provided on the lower end of shaft 615 and controls the up and down movement of the shaft 615 and thus of the abutment member 614. The driving crank 620 has a link 621 (Fig. 17) pivoted to its free end, the other end of the link being secured to a reduced extension 622 of the shaft 604. This extension of the shaft 604 operates in a cylindrical bearing 623 having a slot 624 along its length, the bearing being secured to the underside of the table 100. It will thus be seen that there is substantially no pause in the up and down movement of the shaft 604 but this is allowable owing to the long stroke of the movement and the fact that the bag holder may move to the next position while the last part of the operation i. e. the delivery of the bag, is still taking place.

With regard to the operation of the jaws 601, it will be seen that the jaws are formed on two pivoted arms 625 having projections 626 which enter a groove in the enlarged end 627 of the spindle 628. This spindle passes through the head 602 and is urged upwardly by the spring 629 located within the head 602. Normally therefore the jaws 601 are closed by the action of the spring 629. An actuating arm 630 is pivoted to the arm 603 and carries at its end an actuating pin 631 which engages with the end of the spindle 628. A form 632 is also secured to the arm 630 and carries a spindle 633 which extends through a bracket 634 integral with the bearing 605. The other end of the spindle 633 carries an abutment nut 635. Also mounted in the bracket 634 is a tripping pin 636 which operates on a catch 637 pivoted to the mounting member 638 which is fixed to the arm 603. A spring 639 between members 637 and 638 normally urges the catch 637 in an anticlockwise direction away from member 638. A nose 640 on the catch 637 is adapted under certain conditions to engage a flat provided on a pin 641 mounted on the arm 630.

The position of the apparatus shown in Fig. 16 is that taken up when the shaft 604 is in its lowest position, with the jaws 601 gripping the top edge of the closed bag. When the shaft begins to rise, the catch 637 rotates in an anticlockwise direction and the nose 640 just fails to engage with the flat on the pin 641. The shaft 604 continues to rise and just before the end of the upward movement, the abutment nut 635 on the spindle 633 engages with the underside of the bracket 634. Continued upward movement of the shaft 604 causes the actuating arm to rotate slightly in an anticlockwise direction, thereby causing the actuating pin 631 to depress the spindle 628 with consequent outward movement of arms 625 and opening of the jaws 601. The bag is thus released and falls down the chutes. This rotation of the arm 630 also enables the nose 640 of the catch 637 to engage with the flat on the pin 641 and the arm 630 is thus maintained in this position and hence the jaws remain open until the catch is released. It will be understood that the additional upward movement of the shaft 604 after engagement of the abutment nut 635 and the bracket 634 must be only small and the position of the abutment nut 635 on the spindle 633 is made adjustable to enable this slight movement to be made with accuracy.

The downward movement of the shaft 604 now takes place and the catch remains operated thus holding the jaws open until the pin 636 engages with the catch 632. This trips the catch and the arm 630 returns to its normal position due to the spring 629 acting on the spindle 628, the jaws closing at the same time to grip the bag in the next holder. The position of the pin 636 in the bracket 634 is adjustable to enable the catch to be tripped at a time when the jaws are level with the top edge of the bag.

I claim:

1. In combination in a machine for filling bags with measured quantities of a commodity, a plurality of open-mouthed containers, supporting means for said containers, said supporting means being movable past a plurality of fixed working stations, means for intermittently moving said supporting means in a closed path whereby each of said containers is presented in turn to each of said working stations, means at one of said stations for feeding a bag in the closed condition into the container for the time being at said station, means at a second working station for opening said bag in said container, latches movably mounted on said container operative to clamp the top edges of said bag against the sides of said container so as to maintain said bag in the open condition in said container while said container is moved through a third working station, at which the bag is filled, to a fourth working station, spreader arms supported for movement between a lower position and an upper position at said fourth station, means for lowering said spreader arms from said upper position into said bag and for operating said spreader arms to close said bag, means at said fourth station for releasing said latches in timed relation to the operation of said spreader arms, and means at said fourth station for tack-sealing the top edges of said bag while enabling said spreader arms to be withdrawn from said bag.

2. In combination in a machine for filling bags with measured quantities of a commodity, a plurality of open-mouthed containers, supporting means for said containers, said supporting means being movable past a plurality of fixed working stations, means for intermittently moving said supporting means in a closed path whereby each of said containers is presented in turn to each of said working stations, means at one of said stations for feeding a bag in the closed condition into the container for the time being at said station, at least two suction nozzles supported at a second working station for movement from a retracted position to a bag-engaging position, automatically operated means for moving said suction nozzles from said retracted position to said bag-engaging position and from said bag-engaging position back to said retracted position, means for applying a vacuum to said suction nozzles when they are in the bag engaging position whereby during movement of said suction nozzles from the bag engaging position to the retracted position the bag is opened, latches pivotally mounted on said container operative to clamp the top edges of said bag against the sides of said container, means operative when said nozzles are withdrawn from the side walls of said container for operating said latches, means for disconnecting the vacuum from said suction nozzles substantially coincidentally with the operation of said latches whereby said bag is maintained in the open condition in said container while said container is moved through a third working station at which the bag is filled to a fourth working station, means at said fourth working station for closing and sealing said bag, and means at said fourth working station for releasing said latches in timed relation to the operation of said closing and sealing means.

3. The combination as claimed in claim 2 wherein said latches comprise spring-loaded plates pivoted to the upper ends of the walls of the container.

4. The combination as claimed in claim 2 wherein said latches comprise a pair of latches each having a clamping portion and an actuating portion arranged substantially at right angles to each other, spring means normally urging said clamping portions against the side walls of said container, and actuating members for engaging said actuating portions in timed relation to the advance and withdrawal of said nozzles whereby said clamping portions are pivoted away from said side walls during the advance of said nozzles and again pivoted towards said side walls during the withdrawal of said nozzles.

5. The combination as claimed in claim 4 wherein said actuating members comprise a pair of vertically arranged spindles, and means are provided for imparting to said spindles a reciprocatory movement in timed relation to the reciprocatory movement of said nozzles.

6. The combination as claimed in claim 5 wherein said suction nozzles are provided on oppositely-directed substantially cylindrical coaxial members arranged perpendicular to the side walls of the container.

7. The combination as claimed in claim 6 and comprising first and second actuating rods, a first saddle fixed to said first actuating rod for carrying one of said members, a second saddle fixed to said second actuating rod for carrying the other of said members, a cam device engaging with one of said actuating rods for imparting reciprocatory motion thereto, a rack and pinion drive between said first and second actuating rods whereby said actuating rods move in opposite directions, and spring means connecting said first and second saddles to draw said members together as said first actuating rod is operated by said cam device.

8. The combination as claimed in claim 2 and comprising a pump having intake and exhaust ports, a first cam-controlled valve mechanism for connecting said pump intake to said suction nozzles, a delivery tube at said second working station terminating above the top edges of the bag in said container, and second cam-controlled valve mechanism operated in timed relation to said first valve mechanism to deliver a puff of air through said delivery tube to open said bag when said pump intake is disconnected from said suction nozzles.

9. In combination in a machine for filling bags with measured quantities of a commodity, a plurality of open-mouthed containers, supporting means for said containers, said supporting means being movable past a plurality of fixed working stations, means for intermittently moving said supporting means in a closed path whereby each of said containers is presented in turn to said working stations, means at one of said stations for feeding a bag in the closed condition into a container for the time being adjacent to said station, means at the second station for opening said bag in said container, means on said container for maintaining said bag in said open condition in said container while said container is moved through a third working station at which the bag is filled to a fourth working station, at least two depending spreader arms arranged for movement between a lower position and an upper position provided at said fourth working station, means at said fourth working station for lowering said arms from said upper position into said bag and for moving said arms laterally in an outward direction to close the top edges of said bag, means at said fourth working station for releasing said maintaining means on said container in timed relation to the lateral movement of said arms, and means at said fourth working station for sealing the top edges of said bag at at least one point in a position such as to allow for the subsequent unobstructed withdrawal of said arms.

10. The combination as claimed in claim 9 employing a gusset type bag, comprising two pairs of spreader arms at said fourth working station, each arm of the first pair having a downwardly extending projection while each arm of the second pair is provided with two downwardly extending pins arranged in the operated position to straddle each arm of said first pair, and means for laterally moving the arms of said first pair inwardly and the arms of said second pair outwardly.

11. The combination as claimed in claim 10 and comprising mounting means for said arms at said fourth working station, means for imparting a downward and upward movement to said mounting means, a toggle mechanism for operating said arms, and means for operating said toggle mechanism when said mounting means approach the lowermost position.

12. The combination as claimed in claim 11 wherein said mounting means at said fourth working station additionally carries actuating spindles arranged during the downward movement of said mounting member to engage with said latches to effect the release of the top edges of the bag.

13. The combination as claimed in claim 12 comprising at said fourth working station at least one pair of sealing members arranged on opposite sides of the top edges of said bag, and means for moving said sealing members to engage with the top edges of said bag to effect a seal at the point of contact.

14. The combination as claimed in claim 13 and comprising first and second actuating rods, a first saddle fixed to said first actuating rod for carrying one of said sealing members, a second saddle fixed to said actuating rod for carrying the other of said sealing members, a cam device engaging with one of said actuating rods for imparting reciprocatory motion thereto, a rack and pinion drive between said first and second actuating rods whereby said actuating rods move in opposite directions, and spring means connecting said first and second saddles to draw said sealing members together as said first actuating rod is operated by said cam device.

15. An arrangement for opening bags to receive a measured quantity of a commodity comprising a bag support in the form of an open-mouthed container for receiving a bag in the closed condition and supporting it with the mouth of the bag at the open end of the container, movable supporting means carrying said container, means for intermittently moving said supporting means through a fixed station, suction nozzles provided at said fixed station adapted to engage with the top edges of the sides of the bag and to withdraw said top edges to the sides of the container for opening said bag, latches on said container adapted to be operated to clamp said top edges against the sides of said container for maintaining the bag in open condition, and means for operating said suction nozzles and said latches in timed relationship to said means for intermittently moving said supporting means.

16. An arrangement for closing bags after measured quantity of a commodity has been introduced into the bag, comprising an open-mouthed container, latches on said container, means for operating said latches to maintain said bag in open condition in said container, movable supporting means carrying said container, means for intermittently moving said supporting means through a fixed station, movable spreader arms provided at said fixed station adapted to be introduced into the bag to engage the bag at those points which in the closed condition of the bag lie at the extreme ends of the top of the bag, said spreader arms being arranged for moving in such a manner as to cause said points to move so that the side portions of the top edges of the bags between said points be substantially in a straight line, means for lowering said spreader arms into said bag and for operating said spreader arms to close said bag, means for releasing said latches in timed relationship to the operation of said spreader arms and means for tack sealing the top edges of said bag while enabling said spreader arms to be withdrawn from said bag.

References Cited in the file of this patent

UNITED STATES PATENTS

| Number | Name | Date |
|---|---|---|
| Re. 22,434 | Allen | Feb. 15, 1944 |
| 1,965,745 | Luce et al. | July 10, 1934 |
| 2,011,464 | Winkler et al. | Aug. 13, 1935 |
| 2,059,546 | Brandenburg | Nov. 3, 1936 |
| 2,182,187 | Wagner | Dec. 5, 1939 |
| 2,350,666 | Allen | June 6, 1944 |
| 2,394,007 | Paynter | Feb. 5, 1946 |
| 2,437,117 | Orstrom | Mar. 2, 1948 |
| 2,454,477 | Ray | Nov. 23, 1948 |